US012476412B2

(12) United States Patent
Garcia Canseco et al.

(10) Patent No.: US 12,476,412 B2
(45) Date of Patent: Nov. 18, 2025

(54) MODULAR PLUG

(71) Applicant: Eaton Intelligent Power Limited, Dublin (IE)

(72) Inventors: Erik Garcia Canseco, Ixtapaluca (MX); Elías Martínez Velerio, Nezahualcoyotl (MX); Alejandro García, Tultitlán (MX)

(73) Assignee: EATON INTELLIGENT POWER LIMITED, Dublin (IE)

( * ) Notice: Subject to any disclaimer, the term of this patent is extended or adjusted under 35 U.S.C. 154(b) by 540 days.

(21) Appl. No.: 17/936,203

(22) Filed: Sep. 28, 2022

(65) Prior Publication Data

US 2023/0104525 A1 Apr. 6, 2023

Related U.S. Application Data

(60) Provisional application No. 63/251,669, filed on Oct. 3, 2021.

(51) Int. Cl.
*H01R 13/514* (2006.01)
*H01R 13/05* (2006.01)
(Continued)

(52) U.S. Cl.
CPC ......... *H01R 13/514* (2013.01); *H01R 13/052* (2013.01); *H01R 13/424* (2013.01);
(Continued)

(58) Field of Classification Search
CPC .. H01R 13/514; H01R 13/052; H01R 13/424; H01R 13/502; H01R 13/5205;
(Continued)

(56) References Cited

U.S. PATENT DOCUMENTS 6,071,145 A * 6/2000 Toly ........................ H01R 13/53 439/465
9,124,030 B1 * 9/2015 Chiu .................. H01R 13/6275
(Continued)

FOREIGN PATENT DOCUMENTS

CN 111342289 A 6/2020
WO 2020/076282 A1 10/2018

OTHER PUBLICATIONS

Provisional Opinion Accompanying the Partial Search Results for PCT/EP2022/025454, 9 pages, Munchen, Germany.

*Primary Examiner* — Abdullah A Riyami
*Assistant Examiner* — Nader J Alhawamdeh
(74) *Attorney, Agent, or Firm* — Stinson LLP

(57) ABSTRACT

A plug for use in an electrical connector system includes a handle body assembly comprising a handle body and a flange disposed on an end of the handle body. The flange defines a plurality of openings. A sleeve assembly includes a sleeve and a flange disposed on an end of the sleeve. The flange on the sleeve defines a plurality of openings. The openings in the flange on the handle body are aligned with the openings in the flange on the sleeve. A contact assembly is disposed, at least partially, in the sleeve of the sleeve assembly. The contact assembly includes a contact holder and a plurality of contacts coupled to the contact holder. Fasteners extend through the aligned openings in the flanges to secure the handle body assembly to the sleeve assembly.

20 Claims, 8 Drawing Sheets

(51) Int. Cl.

| | |
|---|---|
| ***H01R 13/424*** | (2006.01) |
| ***H01R 13/502*** | (2006.01) |
| ***H01R 13/52*** | (2006.01) |
| ***H01R 13/627*** | (2006.01) |
| ***H01R 13/629*** | (2006.01) |
| ***H01R 24/86*** | (2011.01) |

(52) U.S. Cl.
CPC ....... *H01R 13/502* (2013.01); *H01R 13/5205* (2013.01); *H01R 13/627* (2013.01); *H01R 13/629* (2013.01); *H01R 24/86* (2013.01)

(58) Field of Classification Search
CPC .... H01R 13/627; H01R 13/629; H01R 24/86; H01R 4/36; H01R 13/42; H01R 13/5202; H01R 24/28; H01R 13/512; H01R 2107/00
See application file for complete search history.

(56) References Cited

U.S. PATENT DOCUMENTS

| | | | | |
|---|---|---|---|---|
| 9,954,305 | B2 * | 4/2018 | Yu | H01R 13/5219 |
| 2014/0273577 | A1 * | 9/2014 | Puluc | H01R 13/62 439/372 |
| 2020/0274284 | A1 * | 8/2020 | Fair | H01R 13/428 |
| 2023/0104525 | A1 * | 4/2023 | Garcia Canseco | H01R 13/629 439/660 |

* cited by examiner

MODULAR PLUG

CROSS-REFERENCE TO RELATED APPLICATION

This application claims priority to U.S. Provisional Patent Application Ser. No. 63/251,669, filed Oct. 3, 2021, and which is hereby incorporated by reference in its entirety.

FIELD OF THE DISCLOSURE

The present disclosure generally relates to a plug for an electrical connector system, and more particularly, to a plug for an electrical connector system wherein the plug has a modular configuration.

BACKGROUND OF THE DISCLOSURE

Plugs, receptacles and connectors are used indoors and outdoors to supply power to various electrical equipment. In particular, explosion-proof receptacles and plugs can be used with portable electrically operated devices such as motor generator sets, compressors, heating and cooling units, welders, conveyors, portable tools, lighting systems and similar equipment. For example, CPP series plugs may be used with CPS series receptacles in corrosive or hazardous locations. Such locations may include, but are not limited to, petroleum refineries, chemical and petrochemical plants, and other process industry facilities subject to hazardous conditions. Also, CPH series plugs can be used with CES series receptacles in hazardous locations. As these types of plugs and receptacles are used in hazardous locations, their applications may also require their removal, adjustment, replacement or frequent maintenance of the plugs/receptacles and related equipment.

Referring to FIGS. 1A and 1B, a conventional electrical connector system 1 is shown including a plug 3 and a receptacle 5. In one embodiment, the receptacle 5 is configured for connection to a power source (not shown), and the plug 3 is configured for connection to an electrical cord (not shown) of a device to be powered. When the plug 3 is connected to the receptacle 5, power is provided to the device. The plug 3 comprises a 3-part assembly including a gland nut 7 for connecting the plug to the electrical cord/device, a handle body 9 threadedly attached to the gland nut at a juncture 11, and a sleeve 13 threadedly attached to the handle body at a juncture 15. The plug 3 is assembled by threadedly attaching the handle body 9 to the gland nut 7 at a first end of the handle body, and to the sleeve 13 at a second end of the handle body. Conversely, the plug 3 is disassembled by detaching the gland nut 7 and sleeve 13 from the handle body 9. However, turning the gland nut 7 during assembly and disassembly of the plug 3 can cause wires 17 in the plug to be twisted. Additionally, assembly of the handle body 9 to the sleeve 13 requires welding contacts in the sleeve to ends of the wires 17. As a result, assembly of the conventional plugs 3 can be labor intensive and take a substantial amount of time. Similarly, disassembly of the plugs 3 can be difficult and time consuming.

SUMMARY OF THE DISCLOSURE

In one aspect, a plug for use in an electrical connector system generally comprises a handle body assembly comprising a handle body and a flange disposed on an end of the handle body. The flange defines a plurality of openings. A sleeve assembly comprises a sleeve and a flange disposed on an end of the sleeve. The flange on the sleeve defines a plurality of openings. The openings in the flange on the handle body are aligned with the openings in the flange on the sleeve. A contact assembly is disposed, at least partially, in the sleeve of the sleeve assembly. The contact assembly comprises a contact holder and a plurality of contacts coupled to the contact holder. Fasteners extend through the aligned openings in the flanges to secure the handle body assembly to the sleeve assembly.

In another aspect, a sleeve assembly of a plug for use in an electrical connector system generally comprises a sleeve comprising a cylindrical housing. A contact assembly is disposed, at least partially, in the cylindrical housing. The contact assembly comprises a contact holder and a plurality of contacts coupled to the contact holder. Each contact includes a wire terminal and a pin extending from the wire terminal. The wire terminal defines a fastener hole for receiving a fastener to secure a wire in the wire terminal.

DETAILED DESCRIPTION OF THE DISCLOSURE

Figure 1A:
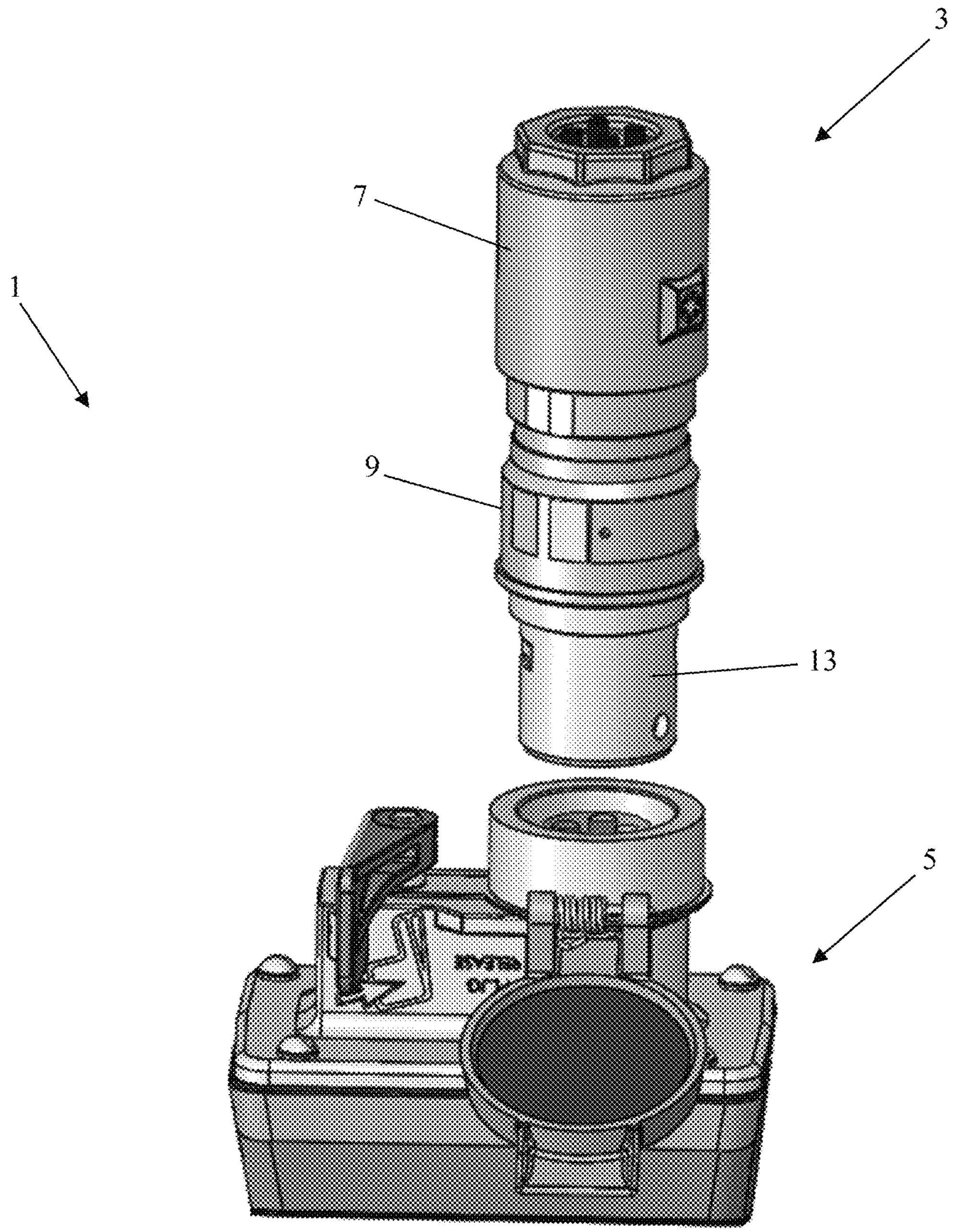
FIG. 1A PRIOR ART
FIG. 1A is a separated view of an electrical connector system of the prior including a plug and a receptacle.
Figure 1B:
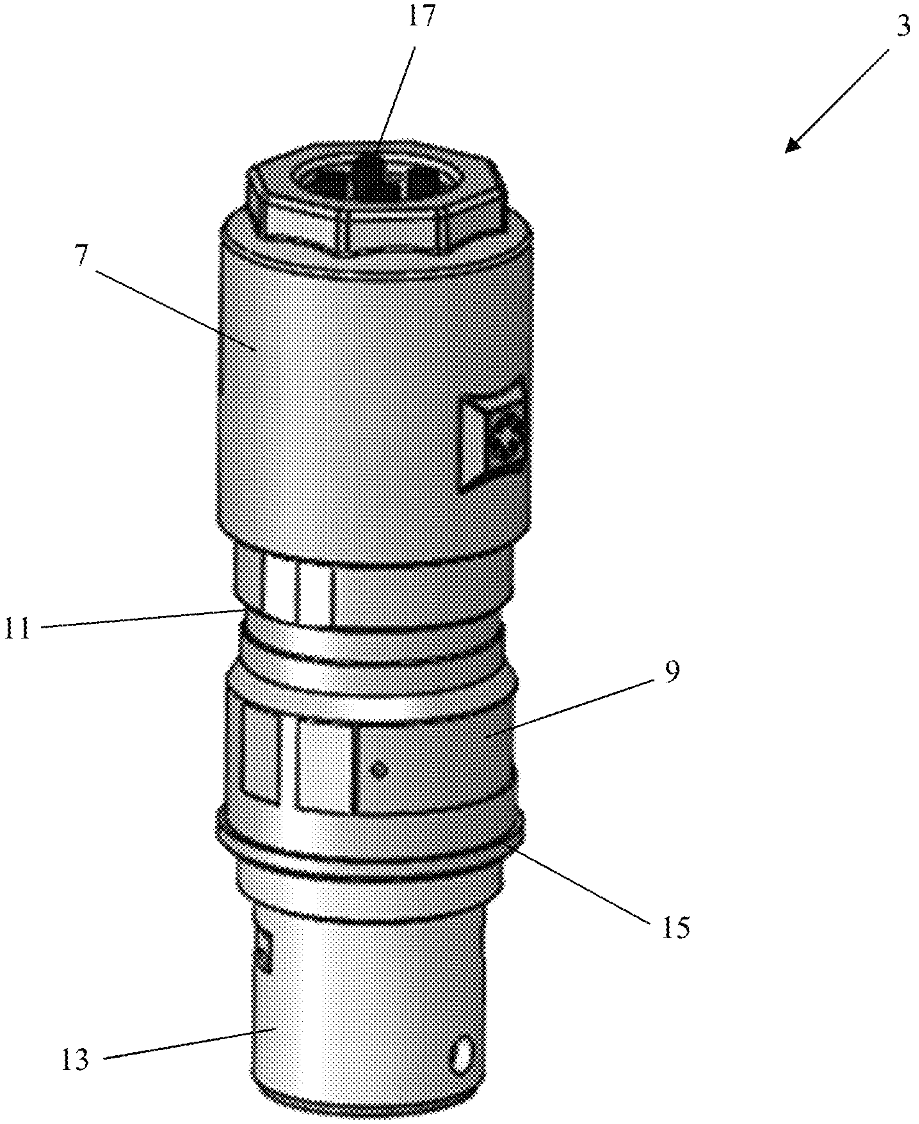
FIG. 1B PRIOR ART
FIG. 1B is a perspective view of the plug in FIG. 1A.
Figure 2:
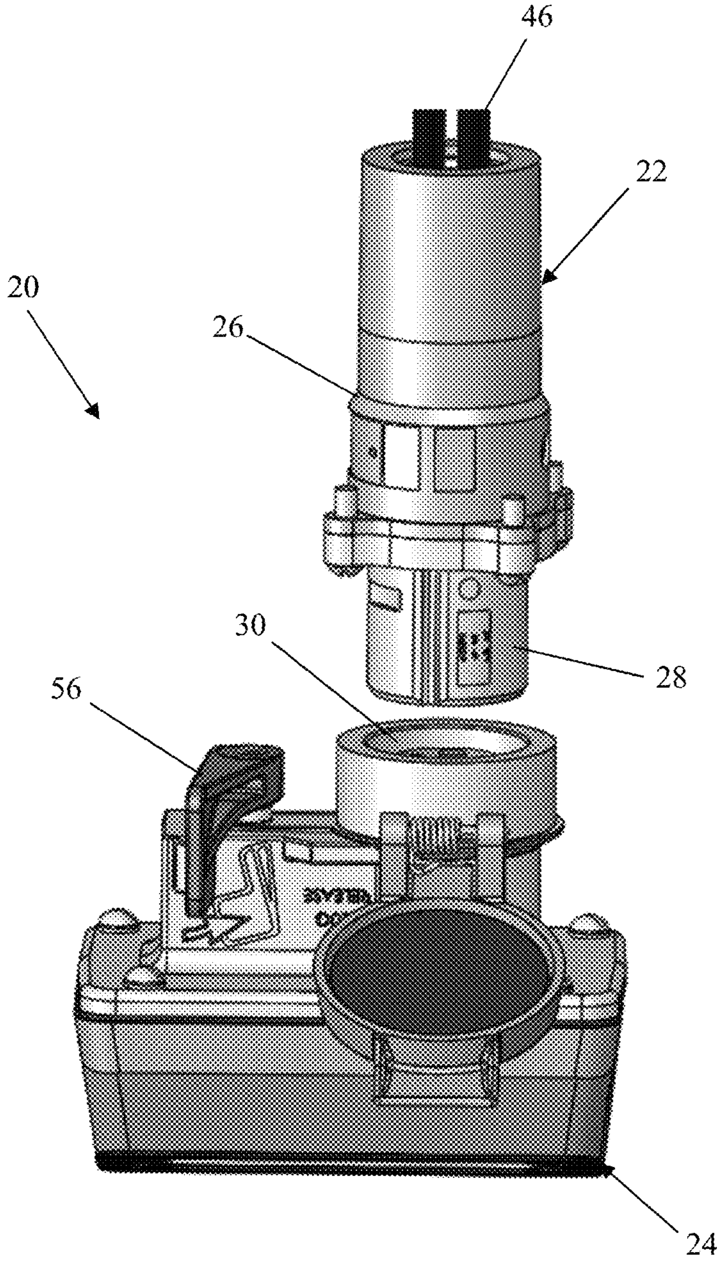
FIG. 2 is a separated view of an electrical connector system constructed according to the teachings of the present disclosure including a plug disconnected from a receptacle.
Figure 3:
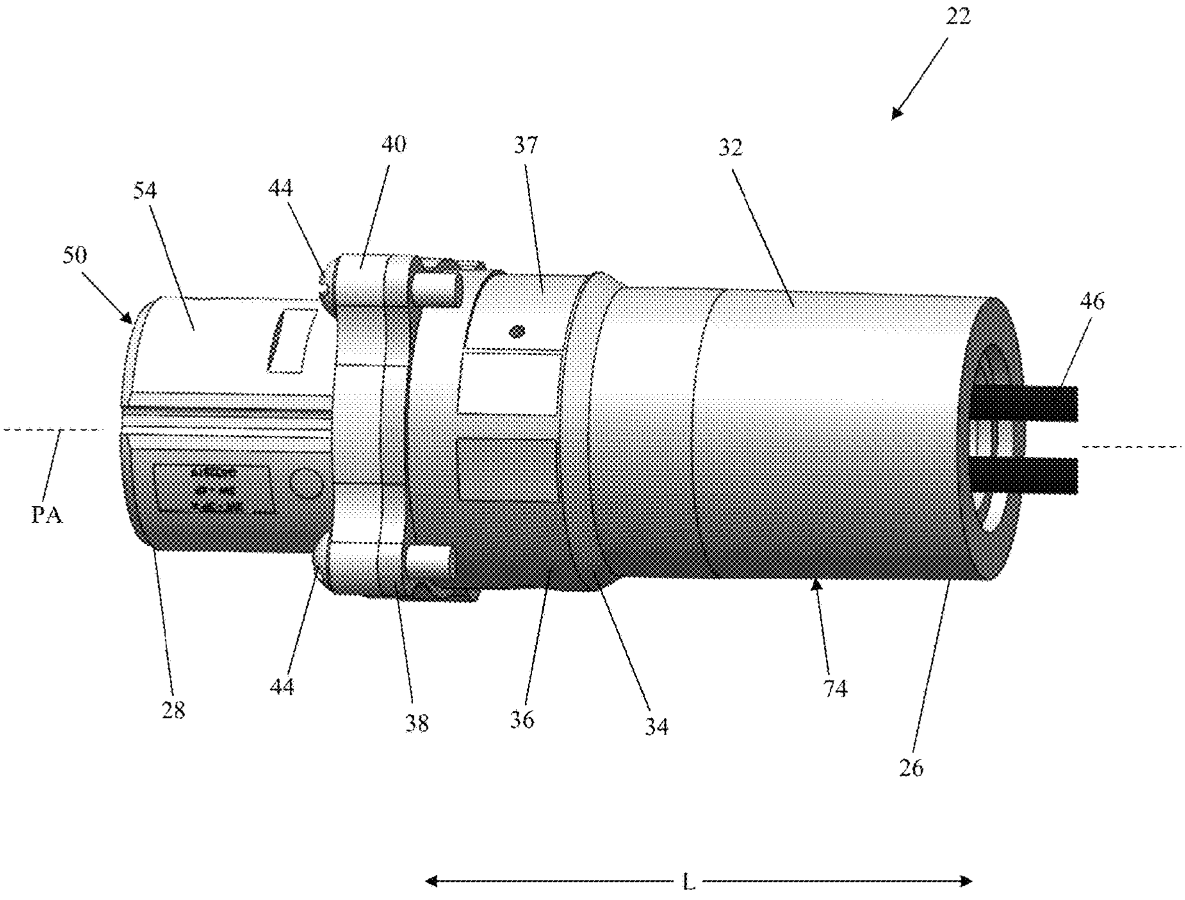
FIG. 3 is a perspective view of the plug in FIG. 2.
Figure 4:
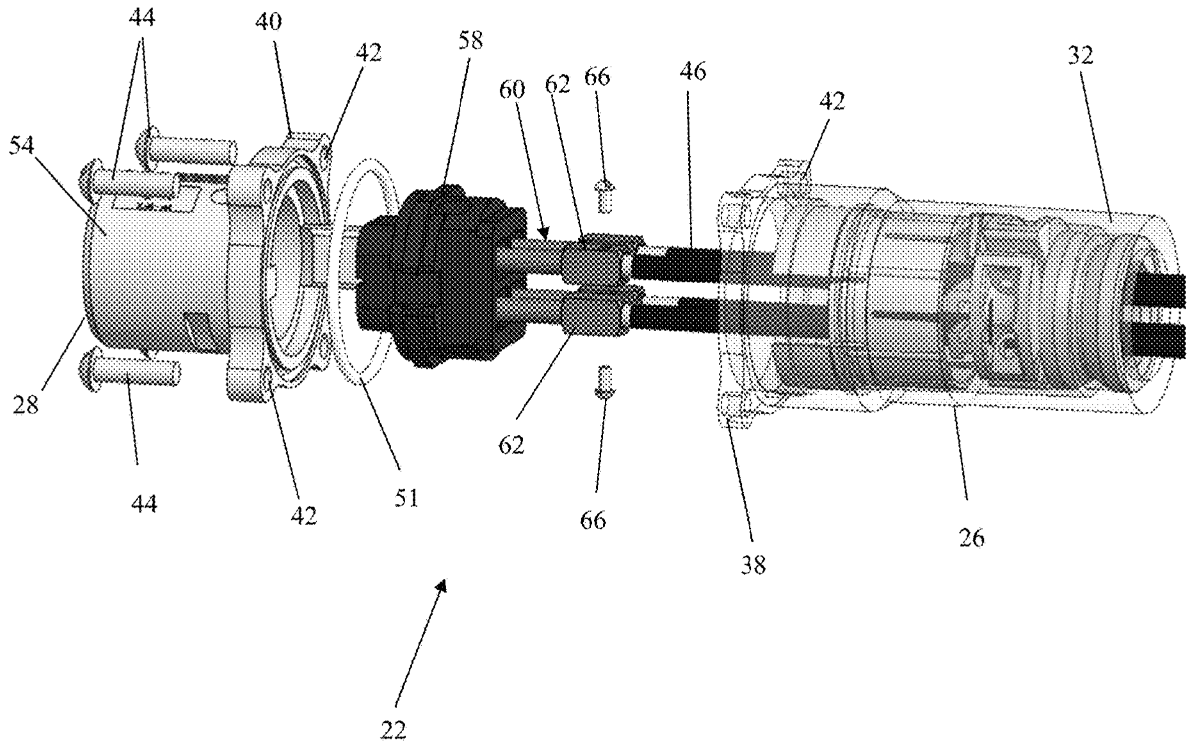
FIG. 4 is a separated view of the plug in FIG. 3 showing a handle body of the plug as transparent.

Referring to FIGS. 2 and 3, an electrical connector system constructed according to the teachings of the present disclosure is generally indicated at reference numeral 20. The electrical connector system 20 includes a plug, generally indicated at 22, and a receptacle, generally indicated at 24, configured to mateably receive and electrically connect to the plug, as shown in FIG. 2. The plug 22 is typically electrically connected to an electrical cord of an electrical device, and the receptacle 24 is typically electrically connected to a power supply, although these may be reversed. As described herein, terms "proximal" and "distal" are used for non-limiting purposes to describe relative locations of the components of the plug 22 and the receptacle 24 with the point of reference being the flow of power from the power supply through the connector system 20 when the receptacle is electrically connected to the power supply and the plug is electrical connected to the electrical device when the connector system is separated. Accordingly, the receptacle 24 is generally located proximal of the plug 22, as used herein. The electrical connector system may be constructed as a switch-rated connector, according to UL 1682, for example.

Referring to FIG. 3, the plug 22 comprises a 2-part housing assembly including a handle body 26 connecting the plug to the electrical cord/device at a distal end of the handle body, and a sleeve 28 attached to a proximal end of the handle body and configured to mate with a connector port 30 (FIG. 2) of the receptacle 24 at a proximal end of the sleeve for establishing an electrical connection between the plug and the receptacle. The plug 22 has a plug axis PA extending between distal and proximal ends of the plug. The handle body 26 comprises a generally cylindrical member having a length L extending along the plug axis PA. The cylindrical member includes a first portion 32 extending from a distal end of the plug 22. The first portion 32 has a slightly angled outer diameter extending along an entire length of the first portion. In one embodiment, the first portion extends over 50% of the length of the handle body. A second portion 34 of the handle body 26 extends from a proximal end of the first portion 32. The second portion 34 flares outward at a constant rate as it extends longitudinally in the proximal direction. Thus, a diameter of the second portion 34 at a proximal end of the second portion is greater than a diameter of the second portion at a distal end. A third portion 36 of the handle body 26 extends from a proximal end of the second portion 34. Along at least some segments of the third portion 36, the third portion has a generally constant outer diameter extending along an entire length of the third portion. However, there are a number of depressions or recesses 37 in the outer surface of the third portion 36 which reduce the outer diameter of the third portion in those areas. The overall shape of the handle body 26, including the first, second and third portions 32, 34, 36, provides an ergonomic outer surface to facilitate grasping the handle body for attaching the handle body to the sleeve 28.

Referring to FIGS. 3-5 and 7, a flange 38 is disposed on a proximal end of the handle body 26, and a flange 40 is disposed on a distal end of the sleeve 28. The flanges 38, 40 project radially outwardly from the hand body 26 and sleeve 28, respectively. Each flange 38, 40 has a generally circular configuration with bell-shaped projections spaced circumferentially around the flange. In the illustrated embodiment, there are four projections spaced approximately 90 degrees apart on each flange 38, 40. However, another number of projections, or flanges without projections, and/or arranged in other ways on the flanges could be used without departing from the scope of the disclosure. The portions of the flanges 38, 40 forming the bell-shaped projections also define fastener holes 42. As such, when the flange 38 on the handle body 26 abuts the flange 40 on the sleeve 28, the fastener holes 42 in the handle body can be aligned with respective fastener holes in the sleeve for receiving fasteners 44 to secure the handle body to the sleeve. Therefore, assembly of the plug 22 is affected by aligning the handle body 26 with the sleeve 28 and inserting the fasteners 44 through the fastener holes 42. Thus, assembly occurs without the need for rotating either of the handle body 26 or sleeve 28 preventing twisting of the wires 46 in the plug. Additionally, the 2-part construction of the plug housing assembly reduces the number of components needed to assemble the plug 22 thereby reducing the overall time needed to complete the assembly. In one embodiment, the plug housing assembly (i.e., handle body 26 and sleeve 28) may be formed from aluminum. However, the plug housing assembly may also be formed from other suitable materials without departing from the scope of the disclosure. In the illustrated embodiment, the flange 38 is formed integrally with the handle body 26, and the flange 40 is formed integrally with the sleeve 28. Thus, in one embodiment, the flanges 38, 40 may be considered part of the handle body 26 and sleeve 28, respectively. It will be understood that the flanges 38, 40 could be formed separately from the handle body 26 and sleeve 28 and suitably attached.

Figure 5:
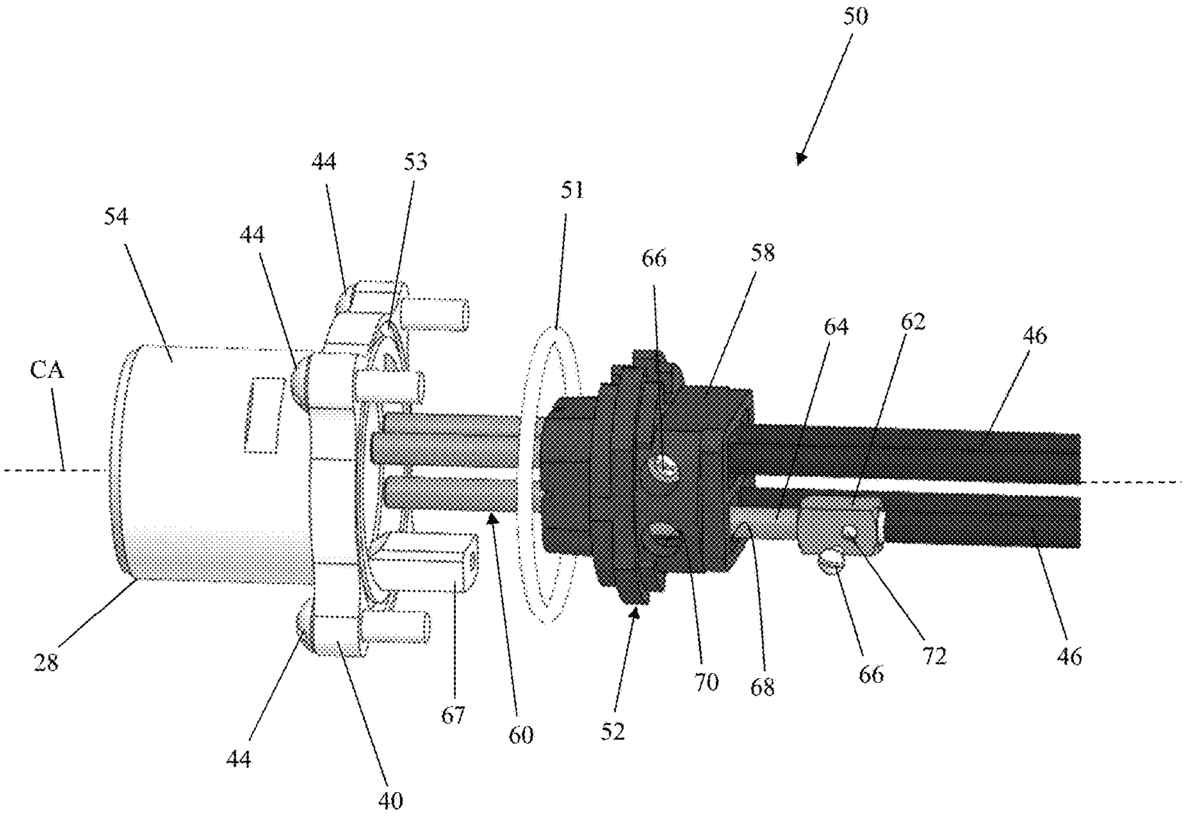
FIG. 5 is a separated view of a sleeve assembly of the plug.
Figure 6:
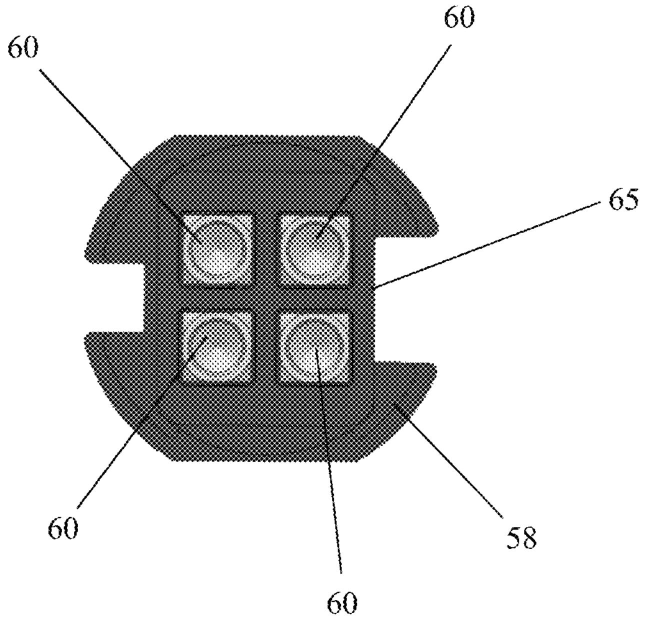
FIG. 6 is a distal end view of a contact assembly of the sleeve assembly.

Referring to FIGS. 5 and 6, a sleeve assembly of the plug 22 is generally indicated at 50. The sleeve assembly comprises the sleeve 28, flange 40, a contact assembly 52 disposed at least partially within the sleeve, and a gasket 51 that is received in an annular groove 53 in a distally facing surface of the flange 40. The sleeve assembly 50 comprises a self-contained unit. As such, the sleeve assembly 50 may be considered a single modular component. The sleeve 28 defines a cylindrical housing 54 that extends proximally from the flange 40 and surrounds at least a portion of the contact assembly 52. The cylindrical housing 54 is sized and shaped for mating with the connector port 30 of the receptacle 24 (FIG. 2). The sleeve 28 is secured in the connector port 30 by a locking arm 56 on the receptacle 24. However, the sleeve 28 could be secured to the receptacle 24 by other means.

Referring back to FIG. 5, the contact assembly 52 comprises a contact holder 58 supporting a plurality of contacts 60. Each contacts 60 includes a wire terminal 62 defining an axial opening for receiving a wire 46 therein, a pin 64 extending proximally from the wire terminal, and a terminal fastener 66 (e.g., set screw) extending generally transversely to the wire terminal for use in securing the electrical wire in the axial opening of the terminal. Together, the wire terminal 62 and the terminal fastener 66 define a wire connector. The contacts 60 may have other configurations without departing from the scope of the disclosure.

The contact holder 58 is received in the cylindrical housing 54 of the sleeve 28. A cutout 65 (FIG. 6) in the contact holder 58 receives a guide post 67 extending distally from the flange 40 to properly position the contact holder relative to the sleeve 28. The contact holder 58 has distal and proximal ends and a contact holder axis CA extending between the distal and proximal ends. The contact holder 58 defines axial passages 68 having open proximal and distal ends (i.e., the axial passages extending through proximal and distal ends of the contact holder). The contact holder 58 also defines transverse passages 70 extending transversely through side walls of the contact holder. Thus, the transverse passages 70 extend transversely to the axial passages 68, and each transverse passage communicates with at least one respective axial passage. The wire terminals 62 of the contacts 60 are received in the axial passages 68, and the pins 64 extend proximally outward from the axial passages. Therefore, in the fully assembled plug 22, the pins 64 of the contacts 60 extend outward (e.g., proximally outward) relative to the contact holder 58 and into the cylindrical housing 54 of the sleeve 28. In the illustrated embodiment, there are four axial passages 68 and four transverse passage 70 (only two are shown). However, another number of axial and transverse passages could be utilized without departing from the scope of the disclosure. It will be understood that the number of axial passages 68 corresponds to the number of contacts 60 as each axial passage receives a dedicated contact.

The transverse passages 70 provide access to the terminal fasteners 66 when the contacts 60 are fully inserted into the axial passages 68 in the contact holder 58. In particular, proximal ends of the wires 46 are inserted into the wire terminals 62 of the contacts 60, and the contacts can then be inserted into the axial passages 68 in the contact holder 58. The terminal fasteners 66 are then inserted into fastener holes 72 in the wire terminals 62 to secure the wires 46 to the contacts 60. Fully inserting the contacts 60 into the axial passages 68 will cause the wire terminal 62 to bottom out within the contact holder 58 preventing further insertion of the contacts. In this position, fastener holes 72, and the fasteners 66 in the holes, will be axially aligned with the transverse passages 70 in the contact holder 58. Therefore, the terminal fasteners 66 can be accessed through the transverse passages 70 to remove the fasteners from the wire terminals 62 or further secure the fasteners to the wire terminals. Alternatively, the terminal fasteners 66 can secure the wires 46 in the wire terminals 62 before the contacts 60 have been fully inserted into the contact holder 58. Therefore, only a single fastener 66 is required to connect a contact 60 to one of the wires 46. In the illustrated embodiment, the transverse passages 70 comprise cylindrical passages having a cross-sectional dimension that is slightly larger than a cross-sectional dimension of a head of the terminal fasteners 66 such that the terminal passages guide the terminal fasteners into and out of the fastener holes 72 to facilitate assembly and disassembly of the contact assembly 52.

This method of attachment greatly simplifies the assembly of the contact assembly 52, and plug 22 as a whole. In particular, conventional methods of welding the proximal ends of the wires to the wire terminals adds a time consuming and technically intensive process step to the assembly of the plug. By needing only to screw a fastener 66 into a hole 72, the construction of the contact assembly 52 is able to be performed without the need for technical welding skills. Similarly, the disassembly of the plug 22 and contact assembly 52 is simplified by needing only a screw driver to detach the contacts 60 from the wires 46.

Figure 7:
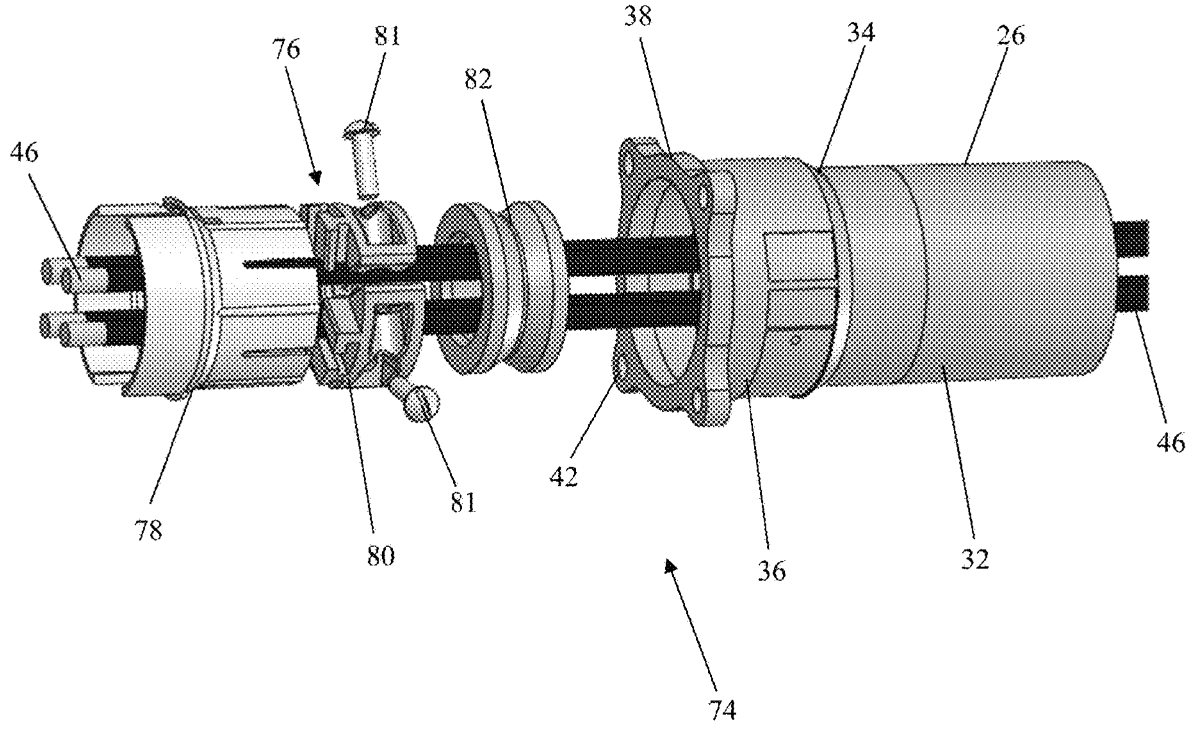
FIG. 7 is a separated view of a handle body assembly of the plug.

Referring to FIG. 7, a handle body assembly of the plug 22 is generally indicated at 74. The handle assembly comprises the handle body 26 and the internal handle components 76 disposed within the handle body. The internal components 76 within the handle body 26 are largely configured to manage the wires 46 within the handle body. In particular, the internal components 76 comprise a spacer 78, a clamp 80 including three tri-locks and three screws 81 (two are shown), and a bushing 82. The handle body assembly 74 comprises a self-contained unit whereby the handle assembly can be attached to and detached from the self-contained unit of the sleeve assembly 50. As previously explained, the flange 38 on the handle body 26 is engaged with the flange 40 on the sleeve 28, and fasteners 44 are received through aligned fastener holes 42 in the flanges, to secure the handle body 26 and handle body assembly 74 to the sleeve 28 and sleeve assembly 50. The gasket 51 (FIG. 4) in the sleeve assembly 50 seals the connection between the flanges 38, 40. Thus, the sleeve assembly 50 and handle assembly 74 represent modular components of the plug 22 that can be removed from the plug and replaced with different, similarly configured assemblies. Accordingly, the plug 22 has a modular configuration that facilitates interchanging the sleeve assembly 50 and handle assembly 74 as needed. As a result, when one of the components becomes worn or damaged, the component can be removed and replaced without having to scrap the entire plug 22.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A plug for use in an electrical connector system comprising:

a handle body assembly comprising a handle body and a flange disposed on an end of the handle body, the flange defining a plurality of openings;

a sleeve assembly comprising a sleeve and a flange disposed on an end of the sleeve, the flange on the sleeve defining a plurality of openings, the openings in the flange on the handle body being aligned with the openings in the flange on the sleeve;

a contact assembly disposed, at least partially, in the sleeve of the sleeve assembly, the contact assembly comprising a contact holder and a plurality of contacts coupled to the contact holder; and fasteners extending through the aligned openings in the flanges to secure the handle body assembly to the sleeve assembly.

2. The plug set forth in claim 1, wherein the handle body assembly and sleeve assembly are both self-contained modular components.

3. The plug set forth in claim 1, wherein the fasteners comprise screws.

4. The plug set forth in claim 1, wherein the flange disposed on the end of the sleeve extends around an entire circumference of the sleeve.

5. The plug set forth in claim 4, wherein the flange disposed on the end of the handle body extends around an entire circumference of the handle body.

6. The plug set forth in claim 1 wherein the handle body comprises a cylindrical member including a first portion having a slightly angled outer diameter extending along an entire length of the first portion, a second portion extending from a proximal end of the first portion and flaring outward at a constant rate as the second portion extends in the proximal direction, and a third portion extending from a proximal end of the second portion.

7. The plug set forth in claim 6, wherein the cylindrical member has a length, the first portion extending over 50% of the length of the cylindrical member.

8. The plug set forth in claim 1, further comprising a gasket disposed between the flanges to seal the connection between the handle body assembly and sleeve assembly.

9. The plug set forth in claim 1, wherein the sleeve is receivable in a receptacle to mateably connect the plug to the receptacle.

10. The plug set forth in claim 1, wherein the handle body and sleeve comprise aluminum.

11. A sleeve assembly of a plug for use in an electrical connector system comprising:

a sleeve comprising a cylindrical housing; and a contact assembly disposed, at least partially, in the cylindrical housing, the contact assembly comprising a contact holder and a plurality of contacts coupled to the contact holder, each contact including a wire terminal and a pin extending from the wire terminal, the wire terminal defining a fastener hole for receiving a terminal fastener to secure a wire in the wire terminal, wherein the wire terminal is configured to secure the terminal fastener in the fastener hole before the contacts have been fully inserted into the contact holder.

12. The sleeve assembly set forth in claim 11, wherein the contact holder defines a plurality of axial passages and a plurality of transverse passages, each contact being disposed in a respective axial passage, and the terminal fastener being receivable in a respective transverse passage.

13. The sleeve assembly set forth in claim 11, wherein each transverse passage communicates with a respective axial passage.

14. The sleeve assembly set forth in claim 13, further comprising a plurality of terminal fasteners, wherein movement of each terminal fastener is guided by the transverse passages.

15. The sleeve assembly set forth in claim 14, wherein the transverse passage comprises a cylindrical passage.

16. The sleeve assembly set forth in claim 11, further comprising a flange disposed on an end of the sleeve, the flange defining a plurality of openings.

17. The sleeve assembly set forth in claim 16, further comprising a gasket received in an annular groove in a distally facing surface of the flange.

18. The sleeve assembly set forth in claim 16, further comprising a guide post extending distally from the flange.

19. The sleeve assembly set forth in claim 11, wherein the sleeve comprises aluminum.

20. A sleeve assembly of a plug for use in an electrical connector system comprising:

a sleeve comprising a cylindrical housing;

a contact assembly disposed, at least partially, in the cylindrical housing, the contact assembly comprising a contact holder and a plurality of contacts coupled to the contact holder, each contact including a wire terminal and a pin extending from the wire terminal, the wire terminal defining a fastener hole for receiving a terminal fastener to secure a wire in the wire terminal;

a flange disposed on an end of the sleeve, the flange defining a plurality of openings;

a guide post extending distally from the flange; and a cutout in the contact holder receiving the guide post to properly position the contact holder relative to the sleeve.

* * * * *